United States Patent [19]

Spencer

[11] Patent Number: 4,741,199

[45] Date of Patent: May 3, 1988

[54] TESTABLE CABLE ENTRY GLAND

[75] Inventor: Herbert J. C. Spencer, Ascot, Berkshire, England

[73] Assignee: Telspec Limited, Rochester, England

[21] Appl. No.: 932,471

[22] Filed: Nov. 18, 1986

[30] Foreign Application Priority Data

Nov. 22, 1985 [GB] United Kingdom ............... 8528789

[51] Int. Cl.⁴ ............................................. G01M 3/26
[52] U.S. Cl. ............................................. 73/46; 277/1
[58] Field of Search ............... 73/40, 49.1, 46; 277/1, 277/2, 3; 174/11 R

[56] References Cited

U.S. PATENT DOCUMENTS

| | | | |
|---|---|---|---|
| 3,161,040 | 12/1964 | Ver Halen | 73/46 |
| 4,019,371 | 4/1977 | Chaplin et al. | 73/46 |
| 4,420,970 | 12/1983 | Organi | 73/46 |
| 4,527,804 | 7/1985 | Spencer | 73/46 |
| 4,603,576 | 8/1986 | Spencer | 73/40 |

FOREIGN PATENT DOCUMENTS 96233 6/1982 Japan ........................................ 73/46

Primary Examiner—Michael J. Tokar
Assistant Examiner—Hezron E. Williams
Attorney, Agent or Firm—Berman, Aisenberg & Platt

[57] ABSTRACT

A method of sealing an electrical cable (2) into a wall (1) utilises a cable entry gland (3) having axially extending sleeves (3a), and the cable gland (3) is sealed to the cable (2) by means of shrink-down sleeving (9) extending over the sleeve portions (3a) and the surface of the cable (2). The cable gland is sealed into an aperture in the wall (1) by means of two "O" ring seals (5, 6) located on opposite sides of the wall (1) between a radial collar of the cable gland (3) and a clamping member (4). A test port (10) is coupled to the space between the portions of sleeving (9) and the "O" ring seals (5, 6) by fluid passages (8, 7) enabling testing of the integrity of the seal, for example by means of a device according to U.S. Pat No. 2,145,233.

6 Claims, 1 Drawing Sheet

TESTABLE CABLE ENTRY GLAND

BACKGROUND OF THE INVENTION

This invention concerns a method of feeding an electric cable through the wall of a joint housing in such a way that the seal around the cable and the seal between an entry gland and the wall of the housing can be proved in the manner described in U.S. Pat. No. 4,603,576.

In U.S. Pat. No. 4,603,576 there is described a method of testing a seal between a cable entry gland and a housing to which it is attached. However, this presupposes that an effective seal can be established between the cable gland and the cable itself, which is not always possible.

SUMMARY OF THE INVENTION

It is thus an object of the invention to provide a method of sealing a cable into a housing wherein both the seal between the entry gland and the housing and the seal between the entry gland and the cable can be tested.

The invention accordingly provides a method of sealing a member such as an electrical cable into an aperture in a wall of a housing, wherein said member is passed through an entry gland adapted to fit said aperture, said member is sealed to said entry gland on both sides thereof by means of corresponding portions of shrink-down sleeving arranged to engage the external periphery of said member, said entry gland is sealed into said aperture by two seals arranged to contact adjacent portions of said wall in such a manner that said two seals and said two positions of sleeving together enclose a common space between the periphery of said member and the periphery of said aperture, and the integrity of the seal enclosing said common space is then tested by applying fluid pressure to said space to establish a pressure drop and across said seals and monitoring potential leakage of fluid to or from the said space.

In one preferred embodiment of the invention, a cable to be sealed into a housing is first passed through a cable entry gland into which it is sealed in a known manner by two sections of heat-shrink tubing in what is sometimes described as a "push-pull" arrangement. The entry gland itself is then sealed into the hole in the housing wall by means of two resilient "O" rings. These are compressed into triangular-section annular cavities formed between the entry gland and the housing wall. Pressure is applied to the "O" rings by means of a back-nut screwed onto the gland on the inside of the housing. The space between the two "O" rings and the space between the gland, the cable sheath and two shrink-downs are linked by air passaged formed in the gland. The two spaces are in turn linked to a test port in the gland which is accessible from outside the housing. The integrity of all four seals formed between the cable, the entry gland and the housing wall is tested by one application of the test device described in U.S. Pat. No. 4,603,576.

DESCRIPTION OF PREFERRED EMBODIMENTS

Figure 1:
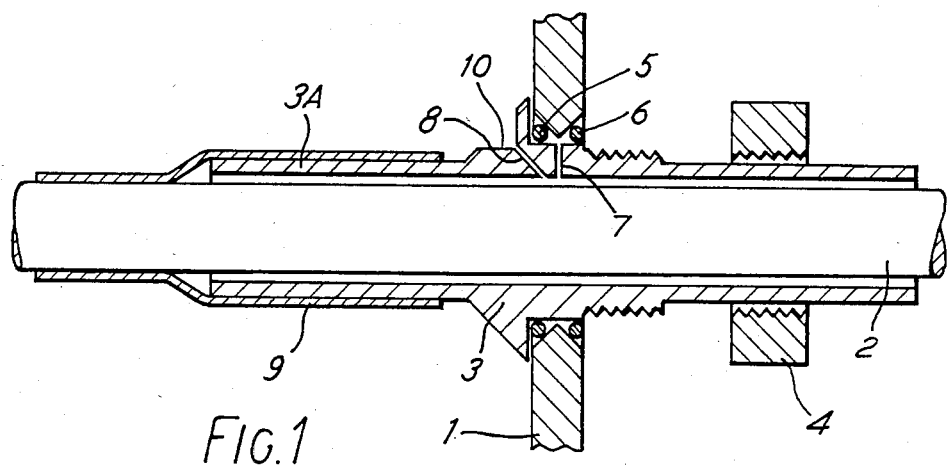
FIG. 1 is a sectional elevation of one arrangement during the formation of a cable seal in accordance with the invention.

In FIG. 1, numeral 1 represents the wall of housing, 2 is the cable to be sealed into the housing, 3, represents the entry gland, 4 is the nut which secures the gland in the housing and 5 and 6 represents the "O" rings which seal the gland to the housing wall. In the figure the nut 4 is shown detached from the gland for clarity. Also for clarity only one shrinkdown seal 9 has been shown applied.

The procedure for sealing a cable into a housing is first to pass a section of heat-shrink tubing 9 over the cable 2, followed by the entry gland 3 with the test-hole end 3a towards the heat shrink tubing. If the cable is an excessively loose fit in the gland it is built up to make it an easy push-fit in the gland by a layer of adhesive tape. The object of this is to reduce the volume of air in the space between cable and gland. If this is excessive the effectiveness of the test applied by the device described in U.S. Pat. No. 4,603,576 is reduced.

Heat is then applied to the heat-shrink tubing 9, so that it collapses on to the gland and the cable. A hot-melt adhesive lining the tubing flows to effect the seal. A second section of heat-shrink tubing (not shown) is passed over the free end of the cable and the entry gland and is shrunk down in turn so that the entry gland is effective sealed to the cable at its two ends.

The "O" ring 5 is now fitted to the entry gland, the gland pushed through the hole in the housing wall 1, and "O" ring 6 fitted to the entry gland within the housing and the nut 4 screwed on to the threaded portion of the gland. As the nut is tightened the "O" rings are compressed within the triangular space formed by the shape of the hole in the housing wall and the entry gland. The effective contacts for sealing the gland into the housing are those between the chamfered faces of the hole and the cylindrical surface of the gland.

The space between the cable sheath, the entry gland and the shrink-down seals at the ends of the gland is connected to the space between the two "O" rings by a passage 7 formed in the entry gland. The two spaces are in turn connected to a conical test port 10 by the passage 8 in the gland.

The sealing of the cable into the housing is tested using the device described in U.S. Pat. No. 4,603,576. The device is cocked and the resilient ball on the tip of the probe is pressed into the conical test hole in the gland. When the trigger of the device is pressed the air pressure within the two spaces is reduced below the atmospheric pressure. If any of the four seals defining the spaces is defective air will leak into the spaces and the pressure will rise. The test device will then indicate that a fault exists. Otherwise after a predetermined time interval the device will indicate that the seals are satisfactory.

It will be evident that if all the four seals are satisfactory then the inner "O" ring seal and the inner shrink-down seal will effectively seal the cable into the housing even when the probe of the test device is removed.

Figure 2:
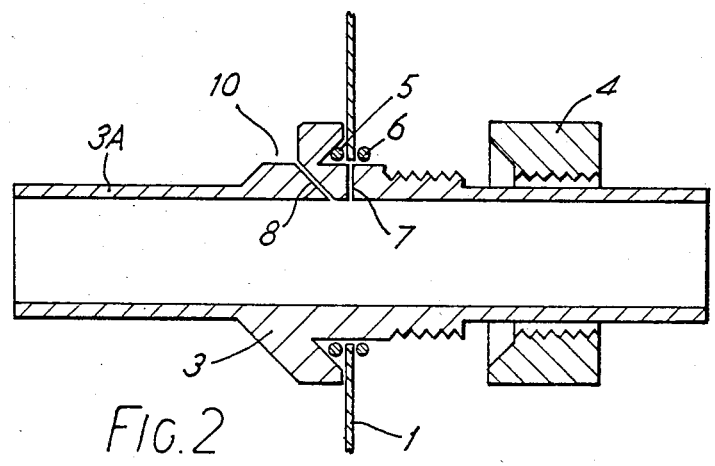
FIG. 2 is a similar view illustrating a modification of the arrangement of FIG. 1.

FIG. 2 illustrates the shapes of the entry gland and of the nut necessary to form the triangular section spaces for the "O" rings when the wall of the housing is too thin to allow them to be formed in the wall, the corresponding parts being illustrated by the same reference numerals as in FIG. 1.

I claim:

1. A method of sealing a member into an aperture in a wall of a housing, wherein said member is passed through an entry gland adapted to fit said aperture, said member is sealed to said entry gland on both sides thereof by means of corresponding portions of shrink-down sleeving arranged to engage the external periphery of said member, said entry gland is sealed into said aperture by two seals arranged to contact adjacent portions of said wall on opposite sides of said wall in such a manner that said two seals and said portions of sleeving together enclose a common spaces between the periphery of said member and the periphery of said aperture, and the integrity of the seal enclosing said common space is then tested by applying fluid pressure to said space to establish a pressure drop across said seals and monitoring potential leakage of fluid to or from the said space.

2. A method as claimed in claim 1, wherein said member is an electrical cable, said entry gland comprises a central annular portion arranged to fit said aperture, a collar arranged to engage one side of said wall around said aperture, and a clamping member screw threaded to the entry gland and arranged to be clamped into engagement with the opposite side of said wall in order to retain said central portion within said aperture, and wherein said seals comprise resilient "O" rings and are located around said central portion of the entry gland respectively between said collar and said wall and said clamping member and said wall.

3. A method of sealing an electrical cable into an aperture in a wall of a housing, wherein said cable is passed through an entry gland comprising a central annular portion adapted to fit said aperture, a collar arranged to engage one side of said wall around said aperture, and a clamping member screw threaded to the entry gland and arranged to be clamped into engagement with the opposite side of said wall in order to retain said central portion within said aperture, and wherein said seals comprise resilient "O"-rings and are located around said central portion of the entry gland respectively between said collar and said wall and said clamping member and said wall, said cable is sealed to said entry gland on both sides thereof by means of corresponding portions of shrink-down sleeving arranged to engage the external periphery of said cable, said entry gland is sealed into said aperture by two seals arranged to contact adjacent portions of said wall in such a manner that said two seals and said adjacent portions of sleeving together enclose a common space between the periphery of said cable and the periphery of said aperture, wherein said central annular portion of the entry gland is formed integrally with axially extending sleeves arranged to surround said cable, and said shrink-down tubing is arranged to overlap the external peripheries of said sleeves and the external surface of said cable, and the integrity of the seal enclosing said common space is then tested by applying fluid pressure to said space to establish a pressure drop across said seals and monitoring potential leakage of fluid to or from the said space.

4. A method as claimed in claim 3, wherein said entry gland is provided with two fluid passages, one of which extends from a point within the entry gland intermediate said sleeves to the exterior of the gland at a point between said collar and said clamping member and the other one of which extends from within the entry gland at a point intermediate said sleeve portions to a test aperture provided in the external wall of said gland member outside of the region located between said collar and said clamping member, and the said "O" ring seals are arranged to include between them the outer end of said first fluid passage.

5. A method as claimed in claim 4, wherein the said collar and the said clamping means have radially extending surfaces for engagement with said wall, and the margin of said aperture on each side of the wall is chamfered to accommodate the corresponding "O" ring.

6. A method as claimed in claim 4, wherein said "O" rings are located against opposite faces of said wall, and said collar and said clamping member are provided with annular recesses to accommodate the "O" rings.

* * * * *